United States Patent [19]

Simons

[11] 3,741,002
[45] June 26, 1973

[54] FLUID TEST APPARATUS AND METHOD

[76] Inventor: Sanford L. Simons, Box 108 Star Rte., Morrison, Colo. 80465

[22] Filed: June 28, 1971

[21] Appl. No.: 157,568

Related U.S. Application Data

[63] Continuation-in-part of Ser. No. 807,011, March 13, 1969, Pat. No. 3,587,295.

[52] U.S. Cl. .................................... 73/64.1, 73/59
[51] Int. Cl. ...................... G01n 11/16, G01n 33/16
[58] Field of Search .......................... 73/64.1, 59, 54

[56] References Cited
UNITED STATES PATENTS

| | | | |
|---|---|---|---|
| 2,839,915 | 6/1958 | Roth et al. ............................. | 73/59 |
| 2,358,374 | 9/1944 | Ashcraft ................................ | 73/59 X |
| 3,062,040 | 11/1962 | McKennell et al. .................... | 73/59 |
| 3,381,525 | 5/1968 | Kartluke et al. ....................... | 73/59 X |

Primary Examiner—Richard C. Queisser
Assistant Examiner—Joseph W. Roskos
Attorney—C. B. Messenger

[57] ABSTRACT

Apparatus and method for determining the coagulation characteristics of fluids in which a sample of a biological or other fluid is subjected to mechanical agitation while a reading is taken by energy sensitive means to determine the instantaneous and/or sequential energy transmitted or absorbed by the fluid. A readout indicative of developing coagulation, shear modulus and/or rheology is obtained that may be coordinated with expired time. In a preferred embodiment a power source having an exciter rod exposed to the fluid sample is provided as a vibrational energy input source. The readout is coupled to the power source-exciter combination to provide an indication of the changes in energy transmitted or absorbed by the fluid sample. Meters or recorder apparatus are used to provide readings of changing energy levels for coordination with the sample exposure time to provide desired information.

14 Claims, 4 Drawing Figures

INVENTOR.
SANFORD L. SIMONS

BY

ATTORNEY.

FLUID TEST APPARATUS AND METHOD

CROSS-REFERENCES TO RELATED APPLICATION

The present application is a continuation-in-part of an application by the same inventor relating to similar subject matter Ser. No. 807,011 which was filed Mar. 13, 1969 now issued as U.S. Pat. No. 3,587,295.

BACKGROUND OF THE INVENTION

The present apparatus is presented to provide information relating to characteristics of fluids. The apparatus is intended to provide data and parameters on the coagulation, shear modulus or rheology of fluids and mixtures so that response times, mechanical properties or preferred treatment procedures may be determined or regulated. An important and perhaps primary use of the invention is directed to studies of biological fluids in which the coagulation rate of the fluid may be indicative of deficiencies in general health, digestion, blood circulation rates, or dehydration and of other factors that are dependent upon fluid circulation capabilities in the body or in inanimate tissue.

One specific and beneficial use of the invention has been established in connection with studies of blood and blood components. In such field the use of modern drugs and medicants that thin or thicken the blood have been hampered by the absence of methods and means for determining the already existing consistency and for further determining the prospective consistency after the administration of specific drugs. The invention provides a means and method for determining the coagulation characteristics of whole blood samples or for samples of blood components. With the establishment of the initial and developed coagulation characteristics, the medical practitioner will be able to more efficiently determine a course for additional treatment and drug administration.

Since the coagulation characteristics of blood are dependent upon many different factors and undoubtedly on the individual combination of components in any particular sample, previous measurements and counts of blood components and of viscosities have not provided reliable information on coagulation characteristics.

The invention has further application in connection with the study of non-Newtonian fluids for the determination of polymerization, flocculation or rheology characteristics.

SUMMARY OF THE INVENTION

Primarily the invention presents a method and apparatus for determining characteristics of fluids. The fluids are subjected to a mechanical energy input, and the intensity of energy that is transmitted or absorbed by the fluid is measured. Changes in the quantity or amplitude of energy transmitted or absorbed is coordinated with the time of exposure and the input energy excitation to obtain output data that may be experimentally related to the coagulation, shear modulus or rheology characteristics of the fluid being tested.

In a preferred embodiment of the invention a measured specimen of fluid, such as blood, is retained in a cup, and an exciter rod is inserted into the body of fluid in position out of contact with the container. The rod is excited or moved with respect to the specimen fluid by a vibrational energy input or other means, and an energy change pickup is provided to determine the intensity of energy that is transmitted or absorbed by the fluid. The intensity of transmitted or absorbed energy is evaluated by readout mechanisms which may be coupled to a permanent type recorder so that progressive changes in the amount of energy transmitted will be made apparent. These changes in the amount and quality of energy transmitted can be related to the coagulation, shear modulus or rheology characteristics of the sample. In a preferred embodiment instantaneous readings are indicative of the total energy transmitted to a fluid sample and the proportionate energy transmitted by or absorbed by such fluid sample with progressive readings coordinated over a period of time being used to indicate progressing changes in such readings and in the sample.

DESCRIPTION OF THE PREFERRED EMBODIMENTS

Figure 1:
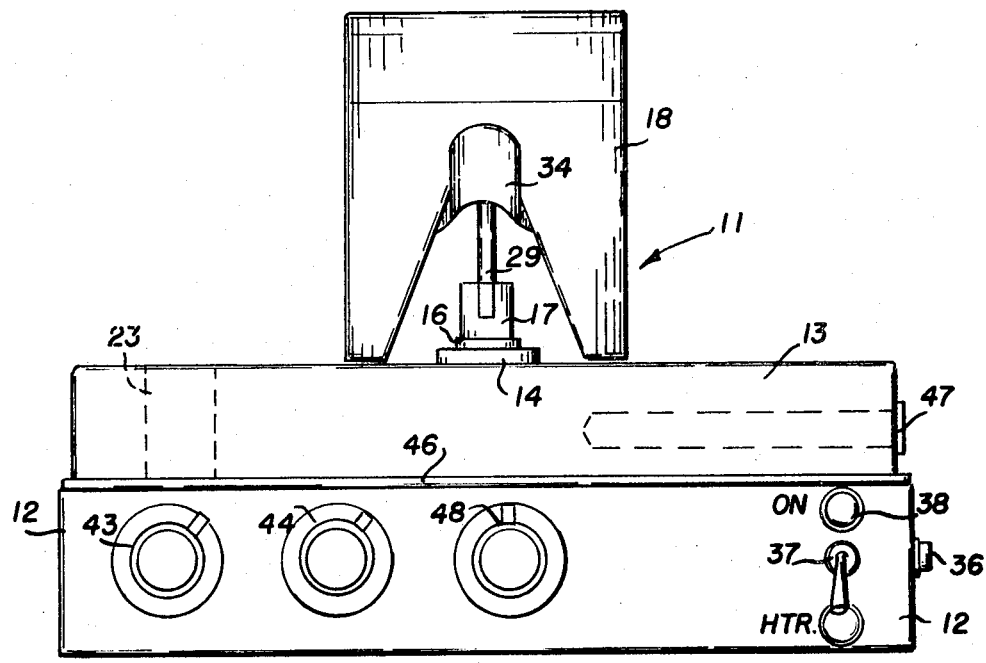
FIG. 1 is a front elevation of a preferred embodiment of the invention.

As a method for determining the coagulation, shear modulus and/or rheology characteristics of fluids, the invention contemplates the establishment of mechanical movement patterns in a fluid. A reading is obtained that is indicative of the total energy input together with the proportionate level of energy transmitted or absorbed by the sample. The resulting energy readout is correlated against the time of exposure or excitation, and progressive changes in the energy readout are used in connection with studies of the fluid sample characteristics.

In the study of particular types of fluids prior readings may have established certain laboratory or analytical values. Accordingly, in connection with the study of such fluids the tabulation of continuing time coordinates may not be necessary. The method therefor encompasses a system in which the energy level at points of test initiation and at intermediate or end points are adequate to define the characteristics for the fluid sample.

In practice of the method the sample may be insulated, or it may be exposed to standard, constant or changing environmental conditions. Apparatus embodiments of the invention provide facilities for maintaining desirable environmental conditions. Essentially the present method and apparatus provides a measurement of the coupling efficiency existing between an excitation rod or probe and the fluid sample. By determining the balance or proportion of energy levels at input and at the readout, this coupling efficiency and/or other changes in the characteristics of the fluid sample may be obtained. When these changes are correlated over a period of time, additional and important information relating to the sample is obtained.

The method of the present invention is primarily intended for use in the study of non-Newtonian fluids where exposure time, the addition of solvents or reagents, or the application of mechanical forces may be expected to change the characteristics of the fluid sample. An exciter rod or probe that is essentially non-elastic for this particular manner of useage is provided to extend into a regulated sample of the fluid being tested. Energy is applied to institute non-deforming movement of the rod within the sample. Preferably a relatively slender rod or exciter probe is moved in a resonant, longitudinal vibrating mode, thus mechanically agitating the sample. While the probe is itself inelastic, the driving device or energy application means may be elastic, and it is desirable that the combination of probe and driving device make up a somewhat resonant or near resonant system when the probe is exposed to the fluid sample.

An energy level for initial excitation of the fluid sample is established, and a readout is obtained that is related to the total energy initially applied to the exciter probe and to any energy losses due to energy being transmitted by or absorbed by the fluid sample. As the test progresses over a period of time and as the time of exposure itself causes the institution of changes in the characteristics of the fluid sample, the proportional amount of energy transmitted or absorbed will change to give a corresponding change in the readout indication. The change may be indicative of a dampening of the amplitude of the original vibrational input or of an increase thereof. Dampening can result from the coagulation of such fluid, or an amplitude increase can be indicative of the attainment of system resonance, or of an initial fluidizing of the sample resulting from exposure to the vibrational excitation, or of a resulting fluidizing of the sample as the sample is broken down into separated constituents. Correlation of the particular time points when such changes are noted or establishment of a rate of change from one condition to another can provide significant information regarding the particular sample being tested. When this information is compared with previously noted results from testing similar samples, useful information can be gained.

In connection with the practice of the method, reactions in the sample itself can be promoted or controlled by the addition of reagents or by changes in environmental conditions. For the testing of typical samples, a standard operating method is contemplated. Where samples of different materials or of widely varying characteristics are to be tested, the methods would include steps changing the amplitude or frequency of the energy input so that a resonant condition could be approached in the testing of all samples. For any particular sample it is recognized that there will be limited resonant condition possibilities, but it is still desirable that such resonant condition be attained or at least approached during the testing period for any particular sample. Establishment or attainment of conditions of resonance not only assures a more efficient operation, but it is possible that the results are less subject to disruptions or errors that may be caused by the application of excess energy.

Samples of blood, plasma and various other biological fluids have been subjected to tests in accordance with the method of the present invention. The results obtained have enabled researchers to identify certain characteristics of the tested fluids that have previously been difficult to ascertain. The method has been extensively investigated in connection with the testing of plasma and whole blood samples to determine the prothrombin time and coagulation characteristics thereof. A typical process in connection with the testing of whole blood samples could include the following procedures. A 0.4 cc sample of whole blood is placed in a sterile cup having a relatively smooth and non-reacting interior surface. With the sample at a predetermined temperature a rod or exciter probe is introduced into the sample in full contact with the blood sample but in non-contacting relation with respect to the retainer cup. A recalcifier is added to the specimen in order to promote the coagulation thereof. Usually a solution of calcium chloride is used as a recalcifier to induce clotting in the sample. Where a ½ mole solution of $CACL_2$ is used, it is added in a ratio of approximately one part solution to eleven parts of sample. The non-elastic exciter rod or probe is energized to institute movement of the rod within the sample. Preferably a relatively slender rod or exciter probe is moved in a resonant, or near resonant, longitudinal vibrating mode to agitate the sample. A readout system is coupled to the exciter probe and/or to the driving device therefor to obtain a reading that is initially indicative of the total energy applied. After an initial period when the fluidity of the sample may actually be increased by the mechanical agitation, coagulation or clotting symptoms are noted. Such symptoms are accompanied by increased dampening or attenuation of the energy level readout, since an increased proportion of the energy delivered to the exciter probe will be absorbed by the blood sample or will be transmitted by such sample for dissipation at the interfaces of the retainer cup. Beneficial results have been obtained where the exciter probe is vibrated at a frequency of from 10 to 100 Hz. and where the amplitude of longitudinal movement for the exciter rod is in the range of 0.0001 to 0.001 inches. Increased frequency and/or amplitude levels provide operative results, but operations may become disruptive. The higher energy levels may also tend to destroy or at least mask some of the characteristics of the fluid that may be of interest in connection with an overall study of certain fluid samples. As previously set forth, operations at resonant or at near resonant conditions are desirable. An optimum frequency and amplitude can be established where power and frequency change capabilities are provided. Under the described conditions it has been established that a Teflon exciter rod of less than 0.1 inch diameter moved by a speaker cone of approximately 2 inch diameter and energized at 80 Hz. will provide a beneficial readout that is near resonance for blood fluids. This readout may be tabulated over a period of time from observations of a meter or the readout may be presented in ordered time sequence by a Viscicorder or similar strip chart recorder.

The tabulated or recorded readings show a change in energy levels over the test period. Points where there is a change from increasing to decreased attenuation or vice versa and points indicating a change in the slope for a plotted curve are significant in connection with the study of the particular blood sample. The rate of change for the slope of the curve may likewise be used to determine characteristics of the blood sample. The time lapse between certain changes may likewise be significant in the study of blood or plasma samples. Rate of change, time lapse, change of slope and the elapsed time for energy reversals can all be beneficially determined in connection with practice of the present method. A representative energy trace is shown in FIG.

4, where increased damping or attenuation of applied energy is shown.

Figure 2:
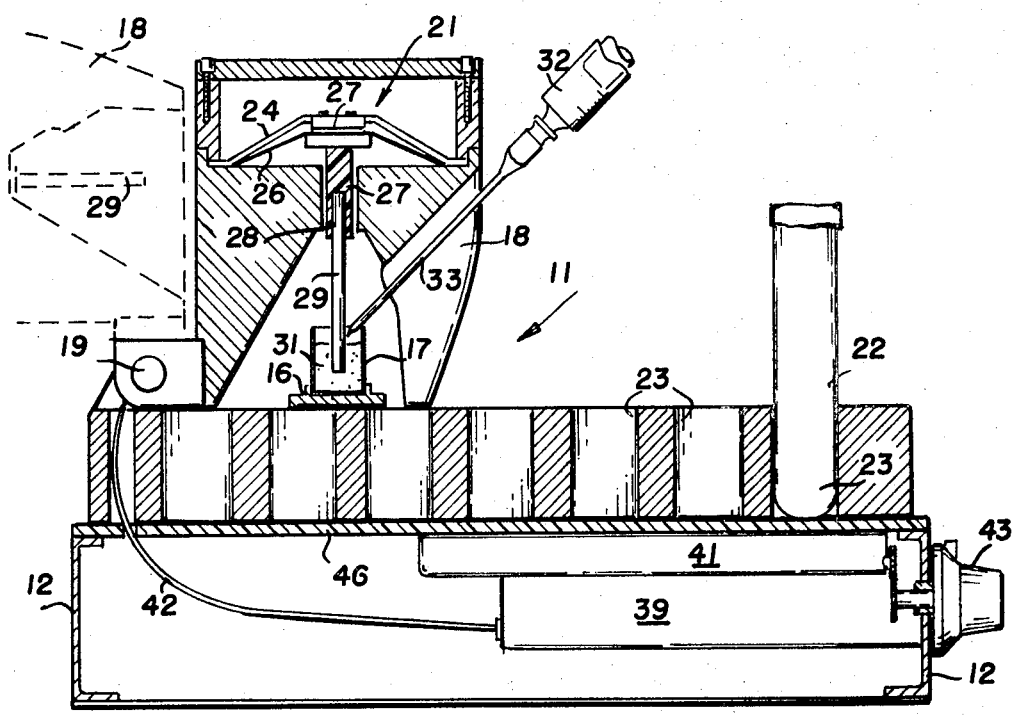
FIG. 2 is a side elevation in partial section showing additional features of such apparatus embodiment.
Figure 3:
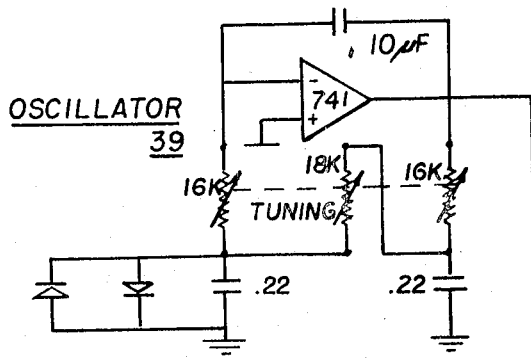
FIG. 3 is a schematic diagram showing the circuitry of a preferred embodiment.

A preferred apparatus embodiment of the invention is shown in FIGS. 1–3. FIGS. 1 and 2 show a suitable hardware type configuration, while FIG. 3 presents a circuit diagram for the components embodied within such configuration. In FIGS. 1 and 2 the test apparatus 11 includes a base 12 of generally hollow construction upholding a heat sink-support block 13. A cup receptacle 14 is disposed centrally and rearwardly on said support 13. A ring 16 on receptacle 14 snugly receives a specimen cup 17 which may be of glass or plastic or other material so long as the interior surface is smooth and of a non-reacting substance for the particular sample. Plastic cups of the size illustrated are quite economical even when provided in sterile condition, and they, accordingly, may be used on a disposable basis.

A suitable driving device 21 is disposed within a pivotally mounted cover 18 that is secured to the support 13 by a hinge pin 19. The support 13 and cover 18 are each of substantial mass so that vibrational energy imparted by the driving device 21 will not be disruptive of other laboratory procedures and will not even disturb additional blood samples that may be retained in test tubes 22 positioned in the receptacles 23 provided in the support 13.

The driving device 21 for this preferred embodiment of the invention is essentially similar to speakers used in radio work. The driving device, accordingly, has a frame 24, a cone 26 and an electro magnet-probe carrier 27 that is connected in an electronic circuit. When the driving device is powered, cone 26 and probe carrier 27 will be vibrated. The lower portion of probe carrier 27 is formed of resilient material, and it provides a counter bore 28 adapted to receive an end of an exciter rod or probe 29. Exciter rod-probes 29 are of a fixed length, and accordingly, when they are fully introduced into counter bore 28, they will extend a prescribed distance outwardly or downwardly therefrom so that the free end thereof will be engaged within sample cups 17 disposed on receptacle 14. With a 0.4 cc sample 31 in the cup, the free end of a probe 29 will be immersed in the sample. When the driving device 21 is powered, the essentially non-elastic exciter rod-probe 29 will be moved longitudinally in a vibrational mode to mechanically agitate the sample 31 in the cup 17.

Before initiation of vibration a quantity of recalcifier is added by a hypodermic syringe 32. A needle 33 of syringe 32 can be extended into a forward opening 34 in cover 18 so that recalcifier is directly applied into sample cup 17. If a ½ mole solution of calcium chloride is used as a recalcifier, it will be added in the proportion of one part $CACL_2$ to eleven parts of sample. With the recalcifier added and with a recorder or meter connected to an output jack 36, toggle switch 37 is moved to the "on" position. Indicator 38 lights up and vibrational energy is applied to probe 29 by the driving device 21.

For blood samples an oscillator 39 and reflex amplifier 41 are designed to energize the driving device 21 at a frequency of 80 Hz. Power from the oscillator-amplifier combination is delivered by cable 42 past hinge pin 19 and to the driving device 21. With a meter or recorder operating an initial reading may be observed, and thereafter the Baseline control knob 43 may be adjusted to bring the readout signal to a level indicating a desired balance between divided circuits within the amplifier itself. Subsequently, Gain control knob 44 can be adjusted to bring the readout indication to a desired scale position. After completion of such initial adjustments, the power is kept on, and a tabulation of readings observed on a meter connected to jack 36 may thereafter be made. If a strip recorder is used, a signal trace will be made automatically on a real time basis to indicate changes in the dampening or attenuation effects exerted by the sample on the movement patterns of the exciter rod-probe as the test is continued. Usually a total test cycle takes less than a minute to derive readings that will provide desired information relating to the characteristics of the blood sample.

Additional refinements are beneficially incorporated in this preferred embodiment of the test apparatus. Since many samples can be tested by the apparatus in a relatively short time, it is desirable that receptacles 23 be provided to hold a plurality of sample tubes 22 in convenient position alongside cover 18. Desirably the receptacle sockets 23 closely engage the sample tubes 22, and accordingly, samples may be extracted from any of the tubes 22 by use of a separate syringe. The extracted sample can be deposited directly through the opening 34 into a new sample cup 17, or the cover 18 may itself be moved to an out of way position, as shown in dotted line representation in FIG. 2 to facilitate insertion of a new sample.

In order to maintain the test samples at a regulated temperature, it is desirable that the heat sink or support 13 be maintained at a fixed temperature. A surface contact heating element 46 is positioned beneath support 13, and a temperature sensor 47 is provided in such support so that the temperature of the support 13 may be controlled within close limits. For present testing operations a temperature of 37° C. has been used. Sensor 47 is wired in a circuit with the heating element 46 to automatically apply or terminate supplemental heating when required. Oscillator 39 and amplifier 41 are also directly mounted on support 13 so that the mass thereof may be used as a heat sink for keeping the electronic circuits, and especially those of the oscillator component, at a regulated temperature. The heat sink capability provided by support 13 is, accordingly, used for a dual purpose. In present configurations a large block of aluminum is used for support 13 as well as for cover 18.

For apparatus that is to be used for testing blood or plasma samples, a fixed frequency can be entirely satisfactory. For test apparatus that may be used on additional biological or other fluids, it is desirable that the apparatus include a tuning control 48 for adjusting the frequency or amplitude of the vibrational input for probe 29. Satisfactory results have also been received with various types of probes 29. These rods may be of solid glass or of various plastics. For fluids in which an end effect might be noted where a reciprocally moving solid rod is used, a hollow rod or rods of other special configuration could be used. For the maintenance of sterile conditions, it is desirable that the rods be of relatively cheap construction so that they likewise may be thrown away after the testing of each separate sample. Where Teflon or other relatively expensive materials are used to minimize potential surface effects, a plurality of rods may be provided for recycled useage after sterilization. All rod materials used in this device may be considered inelastic with respect to the power applied and its manner of application. Oppositely, the cone 26 may be considered elastic, since it powers the longitudinal vibrational movement of the rod. Actually the readout obtained is not in any way derived from or dependent on the establishment of longitudinal, torsional or bending stresses in the exciter rod or probe.

A representative circuit for use with the described apparatus is shown in FIG. 3. Here oscillator 39 and reflex amplifier 41 are shown in circuit arrangement. All of the depicted elements other than the Baseline, Gain, Tuning and Recorder components may be embodied in a unitary printed circuit for direct mounting on support 13. Terminal contacts are provided on the printed circuit board for attachment of such components and for the output to recorder or meter jack 36.

For operation at 80 Hz. and with an 8 ohm speaker the ganged variable potentiometer of the oscillator circuit may be eliminated, and in place thereof resistances of 16K, 18K and 16K ohms, respectively may be substituted therefor. With the ganged variable potentiometers a frequency range of from 10 to 200 Hz. would be desirable.

The operation of the depicted electronic circuits is such that the input from oscillator 39 is divided at 49 into separate circuits. One circuit, inclusive of the driving device or speaker 21, includes an amplifier 51. The other circuit includes Baseline adjustment 43. Ahead of a point of recombination at 52 the remainder of each of the circuits is comparable and balanced each to each except that the diodes operate in reverse direction. With driving device-speaker 21 and amplifier 51 balanced by adjustments of Baseline 43, the signals at 52 can be equal and opposite. The balance of these signals will be disturbed by changes in the impedance and/or reactance of the driving device 21 to provide a desired output signal when the vibrational energy of the system is dampened or attenuated by the exposed probe 29. Amplifier 53 and Gain control 44 are used to modify any output signal to bring it on scale for presentation at a recorder or meter.

Figure 4:
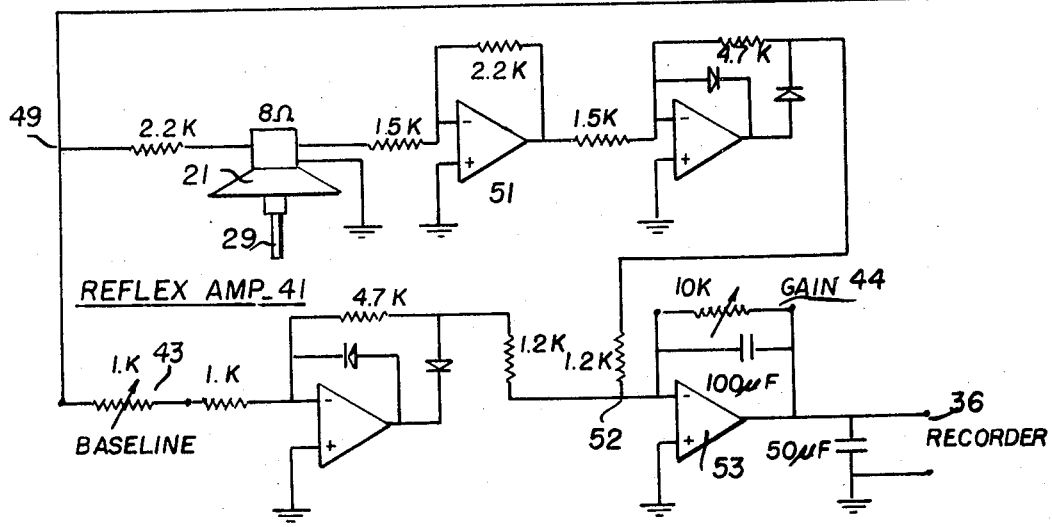
FIG. 4 is a condensed time graphic representation of a typical readout showing characteristic test results obtained in connection with the testing of a blood sample.
Figure 4:
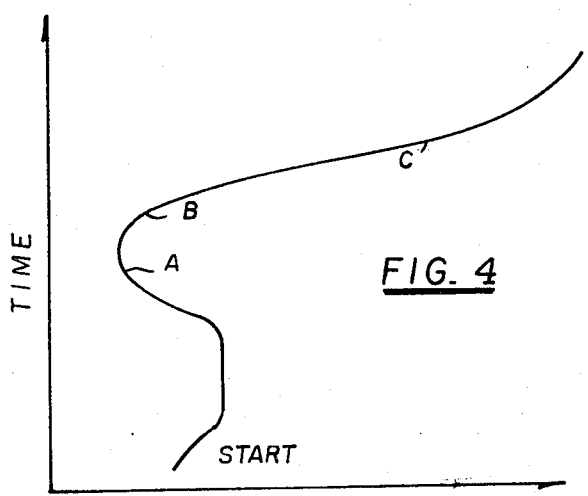

As previously indicated, the signal trace in FIG. 4 is typical of a normal blood sample. For such a signal trace an increase in dampening or attenuation is indicative of the coagulation characteristics of the sample. The rate of increase for any dampening or attenuation is indicated by the slope of the curve. This factor can be correlated with the clotting tendencies for the sample. The proportionate increase in dampening or attenuation over a prescribed period of time can be used as background information to justify the administration or withholding of anti-coagulants.

I claim

1. The method for determining characteristics of body fluid samples which comprises confining a sample to be studied, providing an energy source positioned externally of said sample having a vibrational movement output, disposing an essentially inelastic probe in contact with said sample but out of contact with the sample confining means, intercoupling said probe and energy source to establish a pattern of physical movement for said probe, and utilizing feed-back energy values proportionate to the dampening and attenuation of the probe by the sample in determining the energy absorbed and transmitted by said sample as testing continues.

2. The method as set forth in claim 1 wherein the probe is of slender rod configuration, and the vibrational energy moves said rod-probe in a longitudinally reciprocal pattern.

3. The method as set forth in claim 1 wherein the energy applied and the feed-back energy cooperatively determine an output reading.

4. The method as set forth in claim 3 and further comprising the step of tabulating said output readings over a period of time to establish time spaced correlations thereof.

5. The method as set forth in claim 4 wherein said output readings are recorded over a period of time to provide a chart presentation of said readings.

6. The method as set forth in claim 4 wherein said output readings are on a real time basis to indicate rate of change.

7. The method as set forth in claim 1 wherein the probe and energy source are elastically intercoupled.

8. Apparatus for determining characteristics of fluid samples comprising means for confining a sample to be studied, a power source having a vibrational movement output, an inelastic probe disposed in contacting relation with said sample but out of contact with said confining means, means interconnecting said power source and probe whereby the probe is physically moved within the sample by energy transmitted by said interconnecting means, readout means intercoupled to said power source and sensitive to the power requirements thereof, and feed-back means sensitive to the physical movement patterns of said probe intercoupled to said readout means for determining therewith the levels of energy transmitted and absorbed by said sample, and means for the observation and/or recording of said energy measurements over a period of time whereby changes in the energy level are observed for indications of the characteristics of said fluid sample.

9. Structure as set forth in claim 8 wherein said probe is moved in a longitudinally vibrational mode.

10. Structure as set forth in claim 8 wherein said power source and interconnecting means combination is elastic.

11. Structure as set forth in claim 8 wherein said power source provides sound related vibrational energy.

12. Structure as set forth in claim 11 wherein said power source is provided by a magnet type driving device having a vibrational energy output for moving said probe.

13. The combination as set forth in claim 8 wherein the power source is of a type useable in the propagation of sound and wherein said power source is coupled in a balanced circuit with said feed-back modifying the balance thereof to provide the desired indication of the transmitted and absorbed energy levels.

14. Structure as set forth in claim 8 wherein said power source is positioned externally of said sample confining means and sample.

* * * * *